United States Patent
Cook et al.

[11] Patent Number: 6,032,020
[45] Date of Patent: Feb. 29, 2000

[54] MULTI-REPEATER COMMUNICATION SYSTEM

[75] Inventors: Dean Lawrence Cook, Mesa; David Warren Corman, Gilbert; Carl Robert Gilray, Mesa, all of Ariz.

[73] Assignee: Motorola, Inc., Schaumburg, Ill.

[21] Appl. No.: 08/901,523

[22] Filed: Jul. 28, 1997

[51] Int. Cl.[7] .............................. H04B 3/36; H04B 7/14
[52] U.S. Cl. ................... 455/7; 455/16; 455/523
[58] Field of Search ............... 455/11.1, 7, 103, 455/523, 15, 16, 132, 272, 17

[56] References Cited

U.S. PATENT DOCUMENTS

| | | | |
|---|---|---|---|
| 4,476,574 | 10/1984 | Struven | 455/523 |
| 4,713,809 | 12/1987 | Mizota | 370/97 |
| 4,742,514 | 5/1988 | Goode et al. | 370/109 |
| 4,777,652 | 10/1988 | Stolarczyk | 455/523 |
| 4,879,755 | 11/1989 | Stolarczyk et al. | 455/523 |
| 4,972,505 | 11/1990 | Isberg | 455/523 |
| 5,018,165 | 5/1991 | Sohner et al. | 375/1 |
| 5,187,803 | 2/1993 | Sohner et al. | 455/523 |
| 5,278,989 | 1/1994 | Burke et al. | 455/8 |
| 5,287,543 | 2/1994 | Wolkstein | 455/103 |
| 5,432,838 | 7/1995 | Purchase et al. | 455/523 |
| 5,590,156 | 12/1996 | Carney | 455/509 |
| 5,802,173 | 9/1998 | Hamilton-Piercy et al. | 455/561 |
| 5,890,055 | 3/1999 | Chu et al. | 455/562 |

*Primary Examiner*—Reinhard J. Eisenzopf
*Assistant Examiner*—Duc Nguyen
*Attorney, Agent, or Firm*—Gregory J. Gorrie; James E. Klekotka

[57] ABSTRACT

A structure (24) includes a plurality of repeaters (34), each having a primary transceiver (36) and a secondary transceiver (38) electromagnetically located upon a clear side (30) and a blocked side (32), respectively, of a barrier (26). Each primary transceiver (36) and secondary transceiver (38) communicate using an intra-repeater signal (46). Each intra-repeater signal (46) is output from its respective primary transceiver (36), combined with other intra-repeater signals (46) by a combiner (50), passed over a communication infrastructure (22), separated from other intra-repeater signals (46) by a separator (54), and input to its respective secondary transceiver (38). Optionally, each intra-repeater signal (46) may be retrieved from the communication infrastructure (22), separated from other intra-repeater signals (46) by a separator (62), amplified by a bandpass amplifier (64), combined with other intra-repeater signals (46) by a combiner (66), and inserted back into the communication infrastructure (22).

7 Claims, 3 Drawing Sheets

MULTI-REPEATER COMMUNICATION SYSTEM

FIELD OF THE INVENTION

The current invention relates to the operation of repeaters. More specifically, the current invention relates to the operation of multiple repeaters utilizing a single communication infrastructure.

BACKGROUND OF THE INVENTION

The use of a radio communications device (cellular telephone, pager, etc.) within a building or other structure often poses a transception (transmission and reception) problem. This is especially true when the structure involved has a barrier which substantially attenuates electromagnetic radiation. Such a barrier may be the walls of a building, the roof of a tunnel, the hull of a ship, the fuselage of an airplane, etc. The solution to this transception problem is the use of a repeater.

Exemplarily, a cellular base station requires communication with a cellular telephone within a building. The walls of the building act as a barrier and attenuate the signals between the base station and cellular telephone to the point where direct communication is not possible. A repeater is required for the communication to take place.

The repeater, in its simplest form, may be nothing more than two transceivers coupled back-to-back via coaxial cable. In this example, the first transceiver has its antenna located outside the barrier (e.g. on the roof of the building) where it maintains clear transception with the cellular base station. The second transceiver has its antenna located within the barrier (e.g. inside the building walls) where it maintains clear transception with the cellular telephone. The coaxial cable connects the two transceivers and provides a path for intra-repeater signals between the transceivers. In this manner, the base station and the cellular telephone may communicate indirectly, i.e. through the repeater, even though the cellular telephone is blocked by the barrier from communicating directly with the base station. The repeater bridges the barrier.

The exemplary coaxial cable connecting the two transceivers is a communication infrastructure and a fixture of the building itself.

With communication services becoming increasingly proliferous, individual buildings often require multiple repeaters to fulfill the communication needs of the occupants. Traditionally, these additional repeaters require additional communication infrastructures.

Since the communication infrastructures are fixtures of the building, they are best installed during building construction. For existing buildings, installation during construction is not possible, and additional communication infrastructures must be retrofitted. Such retrofitting is inherently difficult, time-consuming, intrusive, and expensive.

Additionally, some structures may require amplification of the intra-repeater signals to overcome path loss due to long transmission lines, low angenna gain, internal barriers (e.g. ships with steel decks), transmission lengths (e.g. long tunnels), etc. In such cases, multiple communication infrastructures require multiple amplifiers, with attendant expenses.

It is the purpose of the current invention to overcome these and other problems.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
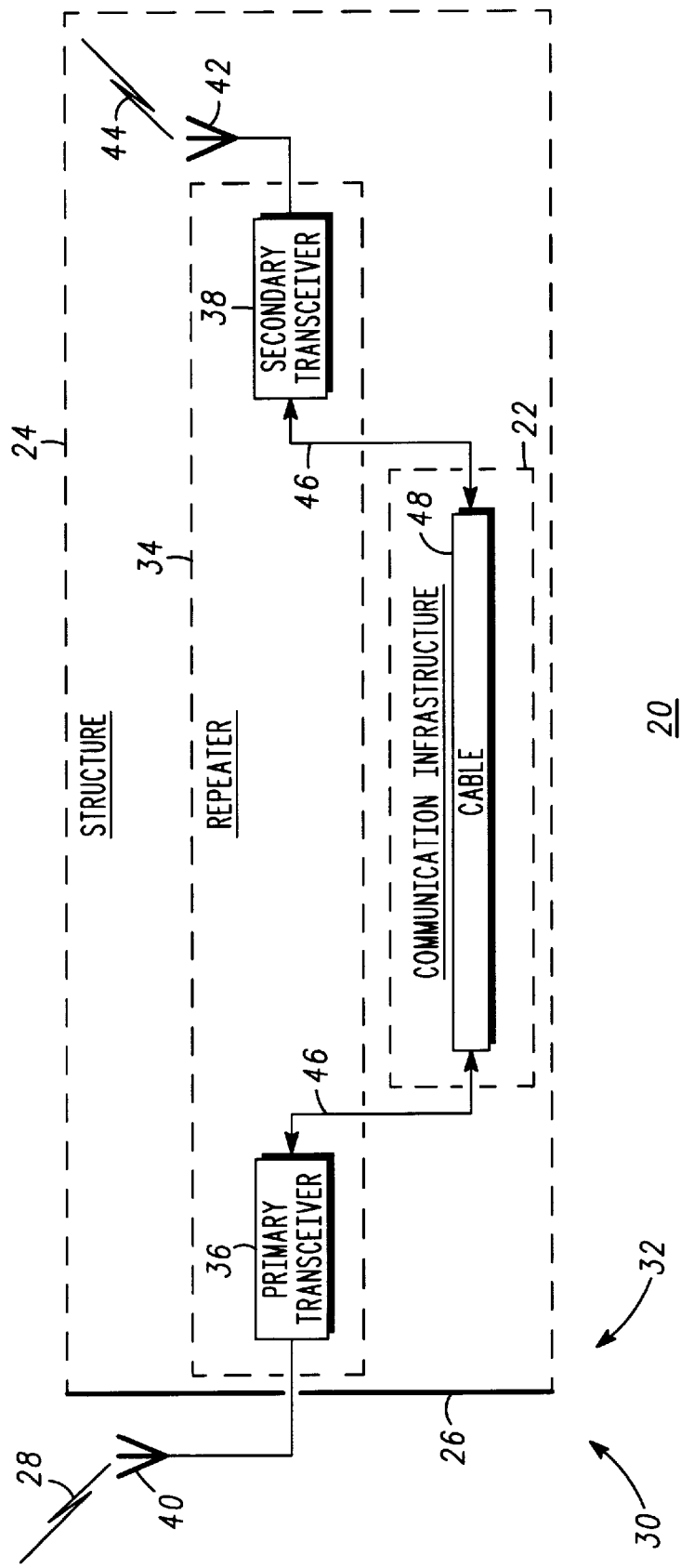
FIG. 1 shows a block diagram depicting a single-band repeater system with a communication infrastructure in accordance with a preferred embodiment of the present invention.

FIG. 1 shows a block diagram depicting a single-band repeater system 20 with a communication infrastructure 22 in accordance with a preferred embodiment of the present invention.

A structure 24 exists in which a repeater system 20 is installed. Structure 24 may take any form (a building, a tunnel, a ship, an aircraft, etc.) in which a barrier 26 (building walls, tunnel roof, ship hull and decks, aircraft fuselage, etc.) exists to attenuate an external signal 28 propagating as electromagnetic radiation to/from an external transceiver (not shown) located at a point (not shown) external to structure 24. External signal 28 represents a frequency band and the set of all associated signals contained therein, e.g. an entire AMPS (Advanced Mobile Phone System) cellular telephone signal set containing numerous bidirectional and unidirectional signals in multiple channels within a given frequency band.

Barrier 26 has a clear side 30 upon which external signal 28 is relatively unattenuated, i.e. the side of barrier 26 upon which the propagation point (not shown) of external signal 28 is located. Barrier 26 also has a blocked side 32 upon which external signal 28 is relatively attenuated, i.e. the side of barrier 26 opposite clear side 30.

A repeater 34 is used to bridge barrier 26. Repeater 34 contains a primary transceiver 36 and a secondary transceiver 38. A primary antenna 40 coupled to primary transceiver 36 is located upon clear side 30 of barrier 26. By having primary antenna 40 so located, primary transceiver 36 is able to effect relatively unattenuated transception (transmission and/or reception) of external signal 28 with the external transceiver (not shown). Thus, the electromagnetic location of primary transceiver 36 is the location of primary antenna 40, and primary transceiver 36 is electromagnetically located upon clear side 30 of barrier 26.

A secondary antenna 42 coupled to secondary transceiver 38 is located upon blocked side 32 of barrier 26. By having secondary antenna 42 so located, secondary transceiver 38 is able to effect relatively unattenuated transception of an internal signal 44 with a radio communication device (not shown) located within structure 24 upon blocked side 32 of barrier 26. The electromagnetic location of secondary transceiver 38 is the location of secondary antenna 42, and secondary transceiver 38 is electromagnetically located upon blocked side 32 of barrier 26.

Internal signal 44 is assumed to be relatively unattenuated upon clear side 30 of barrier 26 in that the radio communication device (not shown), if located upon clear side 30, would not have transception with the external transceiver (not shown) impeded by barrier 26. That is, the radio communication device (a cellular telephone) located on clear side 30 of barrier 26 (outside a building) would be able to communicate freely with the external transceiver (a cellular base station) without the use of repeater 34.

External signal 44 is assumed to be relatively attenuated upon blocked side 32 of barrier 26 in that the radio communication device (not shown), if located upon blocked side 32, would have transception with the external transceiver (not shown) impeded by barrier 26. That is, the radio communication device (the cellular telephone) located on blocked side 30 of barrier 26 (inside the building) would not be able to communicate freely with the external transceiver (the cellular base station) without the use of repeater 34.

Communication infrastructure 22 is configured to be a fixture of structure 24. That is, communication infrastructure is normally an integral part of structure 24. Primary transceiver 36 communicates with secondary transceiver 38 via communication infrastructure 22 using an intra-repeater signal 46. Communication infrastructure 22 is, in this scenario, a coaxial cable 48. In this manner, repeater 34, using communication infrastructure 22, bridges barrier 26 and allows transception between the external transceiver (not shown) and the internal transceiver (not shown).

When communication infrastructure 22 must be retrofitted into an existing structure 24, the retrofitting may be difficult (requiring the breaching of walls and floors, the pulling of appropriate cabling, and the installation of support systems [such as electrical power]), time-consuming (requiring significant planning and execution times), intrusive (disrupting the normal activities of the occupants), and expensive. For these and other reasons, communication infrastructure 22 is normally installed within structure 24 during the construction of structure 24 whenever possible.

Those skilled in the art will recognize that while, in the exemplary scenario, repeater 34 is depicted as a simple pair of transceivers 36 and 38, other types of repeaters having specific hardware and communication protocols for specific external and internal signals 28 and 44 may be utilized. Similarly, while communication infrastructure 22 is depicted as a simple coaxial cable 46, other communication infrastructures (radio frequency radiation, optical fiber, twisted pair, etc.) may be utilized as required.

A problem arises with the single-band system depicted in FIG. 1 when multiple external signals 28 (multiple bands) are to be repeated. Since each external signal 28 is different from every other external signal 28, having different frequency bands, different protocols, etc., a single-band repeater 34 will not successfully repeat multiple external signals 28.

Figure 2:
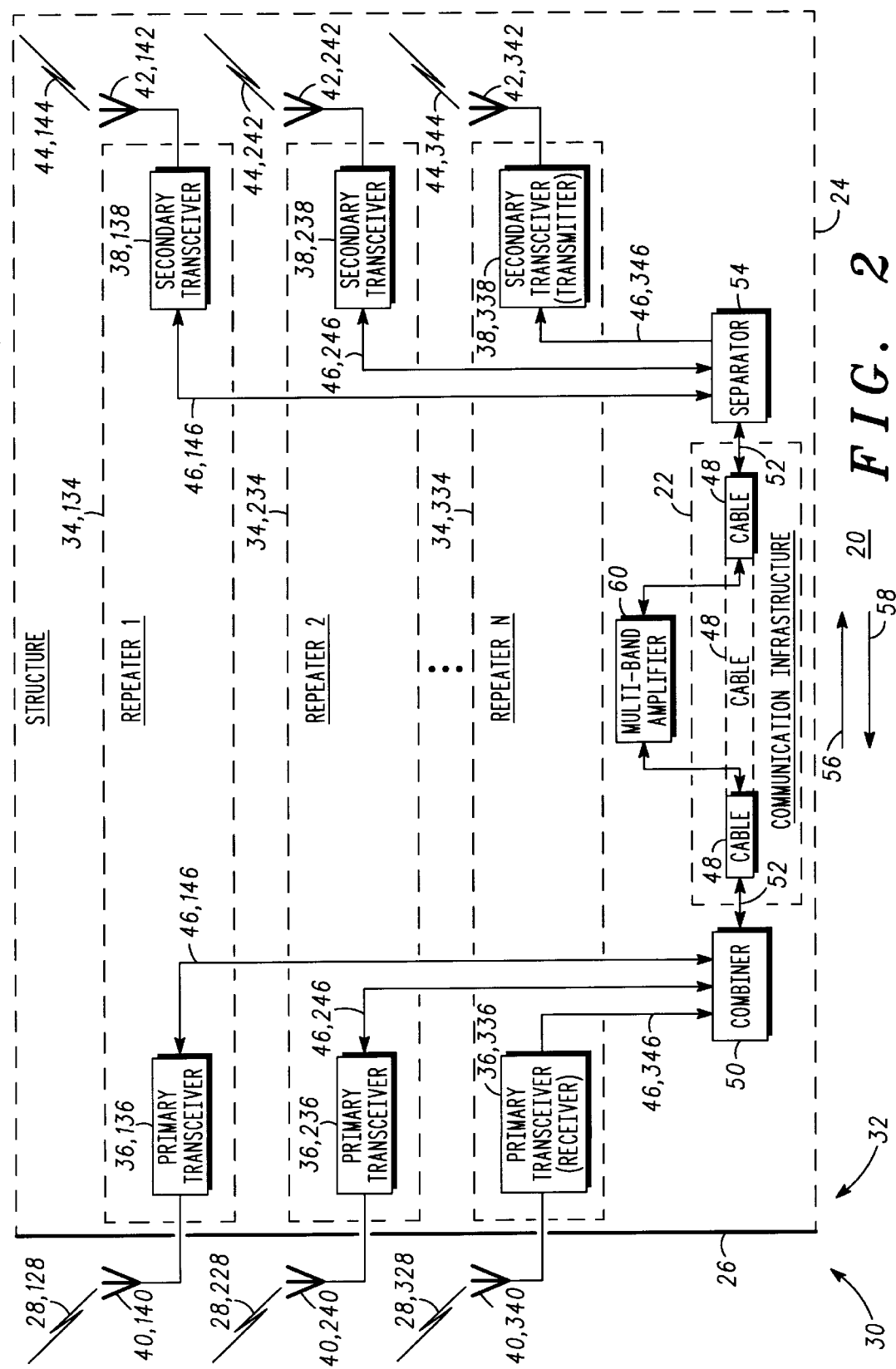
FIG. 2 shows a block diagram depicting a multi-band repeater system with a single communication infrastructure.

FIG. 2 shows a block diagram depicting a multi-band repeater system with a single communication infrastructure in accordance with a preferred embodiment of the present invention. The following discussion refers to FIG. 2.

Throughout the discussion referring to FIG. 2 a scheme of reference numbers is used wherein "generic" components are referenced by two-digit numbers. Specific first, second and third components, however, are referenced by three-digit numbers in the 100s, 200s, and 300s, respectively, while retaining as their last two digits the reference number of their generic counterpart. For example, a "generic" external signal has the reference number "48", while a specific first external signal has the reference number "148", a specific second external signal has the reference number "248", and a specific third external signal has the reference number "348".

A exemplary system 20 is implemented so as to repeat three different external signals 28. Although FIG. 2 depicts system 20 as repeating three external signals 28, system 20 may be configured to repeat any number of external signals 28.

As an exemplary first external signal (band) 128, an AMPS (Advanced Mobile Phone System) cellular telephone signal set is assumed. As a second external signal (band) 228, a PCS (Personal Communication System) cellular telephone signal set is assumed. As a third external signal (band) 328, a simplex (unidirectional) paging signal is assumed. Those skilled in the art will recognize that the above three assumed signals are exemplary only, representing frequency bands containing entire sets of signals, and that no restrictions as to either number or types of signals is implied.

Each of first, second, and third external signals 128, 228, and 328 is unique unto itself. That is, the frequency bands, signal sets, protocols, etc., used by external signals 28 are different for each external signal 28. Therefore, each external signal 28 utilizes a different repeater 34.

First external signal 128 (the AMPS signal set) is repeated by a first repeater 134 to become a first internal signal 144 (a repeated AMPS signal set). Since the AMPS signal set is bidirectional, a first primary transceiver 136 transceives first external signal 128 through a first primary antenna 140 and converts first external signal 128 into a first intra-repeater signal 146. First intra-repeater signal 146 is processed (to be discussed later) and passed to a first secondary transceiver 138. First secondary transceiver 138 converts first intra-repeater signal 146 into first internal signal 144 and transceives first internal signal 144 through a first secondary antenna 142.

Similarly, second external signal 228 (the PCS signal set) is repeated by a second repeater 234 to become a second internal signal 244 (a repeated PCS signal set). Since the PCS signal set is bidirectional, a second primary transceiver 236 transceives second external signal 228 through a second primary antenna 240 and converts second external signal 228 into a second intra-repeater signal 246. Second intra-repeater signal 246 is processed (to be discussed later) and passed to a second secondary transceiver 238. Second secondary transceiver 238 converts second intra-repeater signal 246 into second internal signal 244 and transceives second internal signal 244 through a second secondary antenna 242.

Again, third external signal 328 (the simplex signal set) is repeated by a third repeater 334 to become a third internal signal 344 (a repeated simplex signal set). Since a simplex signal is by definition unidirectional, a third primary transceiver 336, acting only as a receiver, receives third external signal 328 through a third primary antenna 340 and converts third external signal 328 into a third intra-repeater signal 346. Third intra-repeater signal 346 is processed (to be discussed later) and passed to a third secondary transceiver 338. Third secondary transceiver 338 converts third intra-repeater signal 346 into third internal signal 344 and, acting only as a transmitter, transmits third internal signal 344 through a third secondary antenna 342.

The connection between primary transceiver 36 and secondary transceiver 38 in a given repeater 34 is through communication infrastructure 22. Since all three intra-repeater signals 46 in the exemplary scenario are different, each being associated with a specific external signal 28, it is desirable to carry all three intra-repeater signals 46 upon a single communication infrastructure 22. Since all three external signals 28 coexist without interference upon clear side 30 of barrier 26, being different signal sets occupying different frequency bands, they may likewise coexist without interference upon blocked side 32 of barrier 26 as three intra-repeater signals 46 within communication infrastructure 22.

Accordingly, a combiner 50 is coupled between each primary transceiver 36 and communication infrastructure 22. Combiner 50 combines first, second, and third intra-repeater signals 146, 246, and 346 from first, second, and third primary transceivers 136, 236, and 336, respectively, into a combined intra-repeater signal 52 containing all three intra-repeater signals 46. Combiner 50 inserts combined intra-repeater signal 52 into communication infrastructure 22.

A separator 54 is coupled between communication infrastructure 22 and each of first, second, and third secondary transceivers 138, 238, and 338, respectively. Separator 54 retrieves combined intra-repeater signal 52 from communication infrastructure 22, separates it into first, second, and third intra-repeater signals 146, 246, and 346, and then routes them to first, second, and third secondary transceivers 138, 238, and 338, respectively.

In this manner, a multiplicity of intra-repeater signals 46 utilize a single common communication infrastructure 22. The need to retrofit communication infrastructures 22 into existing structures 24 each time a new external signal 28 is to be repeated has been eliminated.

Those skilled in the art will realize that combiner 50 and separator 54 are each a combiner/separator (being bidirectional) and may be simple or sophisticated, passive or active, depending upon the requirements of system 20 and the specific intra-repeater signals 46 to be processed. In many cases, for example, combiner 50 and separator 54 may be identical passive adders when there is no relationship (hence no possibility of interference) between inter-repeater signals 46. Similarly, when conditions so warrant, combiner 50 and separator 54 may be multiplexers/demultiplexers, multipliers, mixers, etc.

Since, in the exemplary scenario, first external signal (band) 128 (the AMPS cellular telephone signal set) is a bidirectional signal, first intra-repeater signal 146 and first internal signal 144 are bidirectional signals, and first repeater 134 and all intra-repeater components are bidirectional components. Bidirectional signals, by definition, propagate in a first direction 56 and a second direction 58. In the exemplary scenario, first direction 56 is that direction in which propagation is from clear side 30 to blocked side 32 of barrier 26, i.e. from outside to inside of structure 24. Second direction 58 is that direction in which propagation is from blocked side 32 to clear side 30 of barrier 26, i.e. from inside to outside of structure 24.

When first signals 128, 146, and 144 propagate in first direction 56, first primary transceiver 136 (acting as a receiver) receives first external signal 128 and outputs first intra-repeater signal 146 to combiner 50. Combiner 50 (acting as a combiner) combines first intra-repeater signal 146 and other intra-repeater signals 46 into combined intra-repeater signal 52, and inserts combined intra-repeater signal 52 into communication infrastructure 22. Separator 54, (acting as a separator) retrieves combined intra-repeater signal 52 from communication infrastructure 22 and separates combined intra-repeater signal 52 into first intra-repeater signal 146 and other intra-repeater signals. First secondary transceiver 138 (acting as a transmitter) inputs first intra-repeater signal 146 from separator 54 and transmits first internal signal 144.

When first signals 128, 146, and 144 propagate in second direction 56, first secondary transceiver 138 (acting as a receiver) receives first internal signal 144 and outputs first intra-repeater signal 146 to separator 54. Separator 54 (acting as a combiner) combines first intra-repeater signal 146 and other intra-repeater signals 46 into combined intra-repeater signal 52, and inserts combined intra-repeater signal 52 into communication infrastructure 22. Combiner 50, (acting as a separator) retrieves combined intra-repeater signal 52 from communication infrastructure 22 and separates combined intra-repeater signal 52 into first intra-repeater signal 146 and other intra-repeater signals. First primary transceiver 136 (acting as a transmitter) inputs first intra-repeater signal 146 from combiner 50 and transmits first external signal 128.

Similarly, since, in the exemplary scenario, second external signal (band) 228 (the PCS cellular telephone signal set) is a bidirectional signal, second intra-repeater signal 246 and second internal signal 244 are also bidirectional signals and second repeater 234 and all intra-repeater components are bidirectional components. Signals 228, 246, and 244 propagate through second primary transceiver 236, combiner 50, communication infrastructure 22, separator 54 and second secondary transceiver 238 in both first direction 56 and second direction 58 in a manner analogous to first signals 128, 146, and 144 discussed above.

On the other hand, since, in the exemplary scenario, third external signal (band) 328 (the simplex pager signal set) is by nature a unidirectional signal, third intra-repeater signal 346 and third internal signal 344 are also unidirectional signals and third repeater 334 and all intra-repeater components are unidirectional components.

Since third signals 328, 346, and 344 propagate only in first direction 56, third primary transceiver 336 (acting always as a receiver) receives third external signal 328 and outputs third intra-repeater signal 346 to combiner 50. Combiner 50 (acting always as a combiner) combines third intra-repeater signal 346 and other intra-repeater signals 46 into combined intra-repeater signal 52, and inserts combined intra-repeater signal 52 into communication infrastructure 22. Separator 54, (acting always as a separator) retrieves combined intra-repeater signal 52 from communication infrastructure 22 and separates combined intra-repeater signal 52 into third intra-repeater signal 346 and other intra-repeater signals. Third secondary transceiver 338 (acting always as a transmitter) inputs third intra-repeater signal 346 from separator 54 and transmits third internal signal 344.

Since intra-repeater signals 146, 246, and 346 are all different, the presence and direction of propagation of any of signals 146, 246, and 346 have no effect upon any others of signals 146, 246, and 346.

Figure 3:
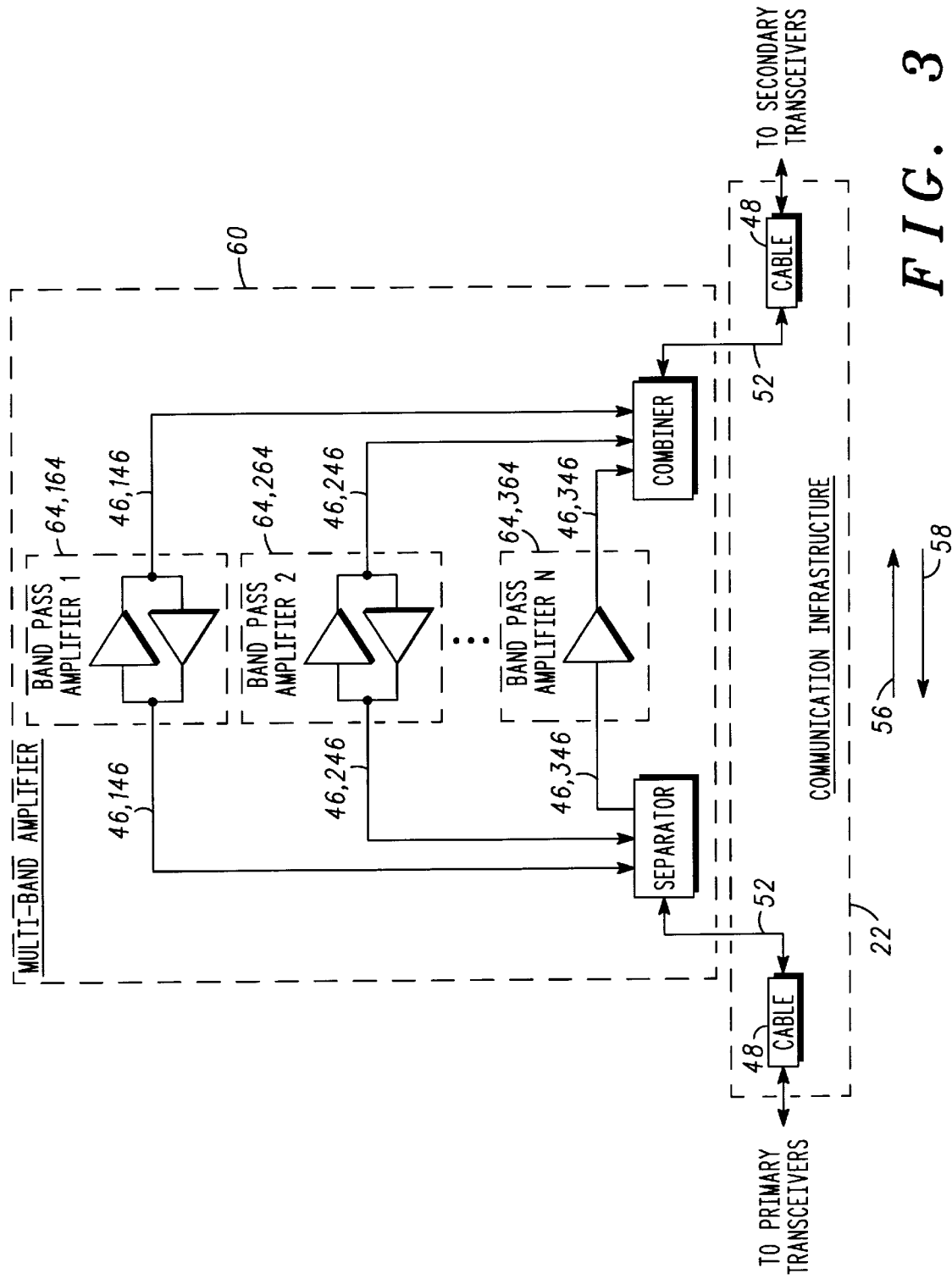
FIG. 3 shows a block diagram depicting a bidirectional multi-band amplifier in accordance with a preferred embodiment of the present invention.

FIG. 3 shows a block diagram depicting bidirectional multi-band amplifier 60 in accordance with a preferred embodiment of the present invention. The following discussion refers to FIGS. 2 and 3.

In some cases, combined intra-repeater signal 52 may require amplification to compensate for losses within communication infrastructure 22. This amplification may be accomplished by a multi-band amplifier 60 coupled to communication infrastructure 22 at some intermediate point between combiner 50 and separator 54. Multi-band amplifier 60, in the exemplary scenario, is connected to a break in coaxial cable 48 of communication infrastructure 22, hence effectively becoming an adjunct of communication infrastructure 22 and invisible to repeaters 34.

In the exemplary scenario, multi-band amplifier 60 contains a separator 62, three bandpass amplifiers 64, and a combiner 66. Separator 62 is coupled between communication infrastructure 22 and each of first, second, and third bandpass amplifiers 164, 264, and 364. Separator 62 operates in a manner similar to that of separator 54 discussed above, and retrieves combined intra-repeater signal 52 from communication infrastructure 22 and separates combined intra-repeater signal 52 into first, second, and third intra-repeater signals 146, 246, and 346. First, second, and third bandpass amplifiers 164, 264, and 364 amplify first, second, and third intra-repeater signals 146, 246, and 346, respectively. Combiner 66 operates in a manner similar to combiner 50 discussed above, and recombines the separated first, second, and third intra-repeater signals 146, 246, and 346 back into combined intra-repeater signal 52 and inserts this combined intra-repeater signal 52 into communication infrastructure 22.

Those skilled in the art will realize that separator 62 and combiner 66, like separator 54 and combiner 50 previously discussed, are each a combiner/separator (being bidirectional) and need be only as complex as required for system 20 and the specific intra-repeater signals 46 to be processed.

Since, in the exemplary scenario, first external signal (band) 128 (the AMPS cellular telephone signal set) is a bidirectional signal, first intra-repeater signal 146 is also a bidirectional signal, and first bandpass amplifier 164 is a bidirectional bandpass amplifier.

When first intra-repeater signal 146 propagates in first direction 56, separator 62 (acting as a separator) retrieves combined intra-repeater signal 52 from communication infrastructure 22 and separates combined intra-repeater signal 52 into first intra-repeater signal 146 and other intra-repeater signals 46. First bandpass amplifier 164 (acting as an amplifier in first direction 56) inputs first intra-repeater signal 146 from separator 62, amplifies it, and outputs it to combiner 66. Combiner 66 (acting as a combiner) recombines first intra-repeater signal 146 and other intra-repeater signals 46 back into combined intra-repeater signal 52 and inserts combined intra-repeater signal 52 into communication infrastructure 22.

When first intra-repeater signal 146 propagates in second direction 58, combiner 66 (acting as a separator) retrieves combined intra-repeater signal 52 from communication infrastructure 22 and separates combined intra-repeater signal 52 into first intra-repeater signal 146 and other intra-repeater signals 46. First bandpass amplifier 164 (acting as an amplifier in second direction 58) inputs first intra-repeater signal 146 from combiner 66, amplifies it, and outputs it to separator 62. Separator 62 (acting as a combiner) recombines first intra-repeater signal 146 and other intra-repeater signals 46 back into combined intra-repeater signal 52 and inserts combined intra-repeater signal 52 into communication infrastructure 22.

Similarly, since, in the exemplary scenario, second external signal (band) 228 (the PCS cellular telephone signal set) is a bidirectional signal, second intra-repeater signal 246 is also a bidirectional signal and second bandpass amplifier 264 is a bidirectional bandpass amplifier. Second intra-repeater signal 246 propagates through separator 62, second bandpass amplifier 264 and combiner 66 in both first direction 56 and second direction 58 in a manner analogous to first intra-repeater signal 146 discussed above.

On the other hand, since, in the exemplary scenario, third external signal (band) 328 (the simplex pager signal set) is a unidirectional signal, third intra-repeater signal 346 is a unidirectional signal and third bandpass amplifier 364 is a unidirectional bandpass amplifier.

Since third intra-repeater signal 346 propagates only in first direction 56, separator 62 (acting always as a separator) retrieves combined intra-repeater signal 52 from communication infrastructure 22 and separates combined intra-repeater signal 52 into third intra-repeater signal 346 and other intra-repeater signals 46. Third bandpass amplifier 364 (acting always as an amplifier only in first direction 56) inputs third intra-repeater signal 346 from separator 62, amplifies it, and outputs it to combiner 66. Combiner 66 (acting always as a combiner) recombines third intra-repeater signal 346 and other intra-repeater signals 46 back into combined intra-repeater signal 52 and inserts combined intra-repeater signal 52 into communication infrastructure 22.

The use of individual bandpass amplifiers 64 within multi-band amplifier 60, as opposed to a single wide-band amplifier, allows each intra-repeater signal 46 to be independently amplified. Independent amplification may be desirable. If, for example, for first intra-repeater signal 146, communication infrastructure 22 has a greater absorption than for second intra-repeater signal 246. In this and other situations first bandpass amplifier 164 could have greater gain than second bandpass amplifier 264 to compensate for the absorption. Independent amplification also significantly reduces potential inter-signal interference.

The use of multiple bandpass amplifiers 64 for different frequency bands allows the use of filtered and shaped passbands. This eliminates the problems of cross-modulation and other interference often encountered with wideband amplifiers.

Those skilled in the art will readily appreciate that these and other well-known techniques may be used according to the needs of the signals and components to be accomodated.

In summary, the present invention allows the utilization of multiple repeaters 34 with a single communication infrastructure 22. Consequently, when an additional repeater is added to an existing repeater, only a combiner, separator and amplifier, if present, are affected. This eliminates the need for costly, time-consuming, and intrusive retrofitting of a cable with its attendant expense. Additionally, amplification of intra-repeater signals 46 by multi-band amplifier 60 effects compensation for signal losses within communication infrastructure 22.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A multi-band communication repeater system comprising:

a communication infrastructure configured to be a fixture of a building;

a plurality of repeaters, wherein each one of said repeaters has a primary transceiver, comprising at least one antenna located outside said building and a secondary transceiver, comprising at least one antenna located inside said building, and each one of said repeaters is configured to utilize an intra-repeater signal to communicate between said primary transceiver and said secondary transceiver via said communication infrastructure, wherein a first repeater is configured to utilize a first intra-repeater signal which is an AMPS (Advanced Mobile Phone System) signal, a second repeater is configured to utilize a second intra-repeater signal which is a PCS (Personal Communications System) signal, and a third repeater is configured to utilize a third intra-repeater signal which is a paging signal, said intra-repeater signals coexisting as different signal sets occupying different RF frequency bands;

a combiner coupled between said primary transceiver and said communication infrastructure, said combiner being configured to combine said first intra-repeater signal, said second intra-repeater signal, and said third intra-repeater signal into a combined intra-repeater signal;

a separator coupled between said communication infrastructure and said secondary transceiver, said separator being configured to separate said combined intra-repeater signal into said first intra-repeater signal, said second intra-repeater signal, and said third intra-repeater signal; and a multi-band amplifier coupled between said combiner and said communication infrastructure, said multi-band amplifier comprising:
- a second separator configured to separate said combined intra-repeater signal into separated intra-repeater signals,
- a plurality of bandpass amplifiers configured to amplify said separated intra-repeater signals, and
- a second combiner configured to combine said amplified intra-repeater signals.

2. A system as claimed in claim 1 wherein one of said bandpass amplifiers is a bidirectional bandpass amplifier.

3. A system as claimed in claim 1 wherein said bandpass amplifiers are configured to pass different frequency bands.

4. A method of using a common communication infrastructure within a building to support a plurality of repeaters, said method comprising the steps of:

configuring first and second ones of said plurality of repeaters to have first and second primary transceivers, respectively, and first and second secondary transceivers, respectively, and to use first and second intra-repeater signals for communication between said first primary and secondary and said second primary and secondary transceivers, respectively, wherein said first intra-repeater signals are AMPS (Advanced Mobile Phone System) signals, and said second intra-repeater signals are PCS (Personal Communications System) signals;

combining said first and second intra-repeater signals from said first and second primary transceivers, respectively;

inserting said combined first and second intra-repeater signals into said communication infrastructure;

retrieving said inserted first and second intra-repeater signals from said communication infrastructure;

separating said retrieved first and second intra-repeater signals;

amplifying said separated first and second intra-repeater signals in a multi-band amplifier;

combining said amplified first and second intra-repeater signals;

inserting said combined amplified signals into said communication infrastructure;

retrieving said combined amplified signals from said communication infrastructure;

separating said amplified first and second intra-repeater signals from combined amplified signals; and routing said amplified first and second intra-repeater signals to said first and second secondary transceivers, respectively.

5. A method as claimed in claim 4 wherein:

said building has a barrier which substantially attenuates electromagnetic radiation, said barrier having a clear side and a blocked side; and said method additionally comprises the step of installing said communication infrastructure to become a fixture of said building.

6. A method as claimed in claim 5 additionally comprising the steps of:

electromagnetically locating said first and second primary transceivers upon said clear side of said barrier; and electromagnetically locating said first and second secondary transceivers upon said blocked side of said barrier.

7. A method as claimed in claim 4 wherein said amplifying step independently amplifies said separated first and second intra-repeater signals.

* * * * *